Oct. 22, 1974   C. KENT   3,843,475
PLASTICS TRIM STRIPS
Filed Feb. 10, 1972
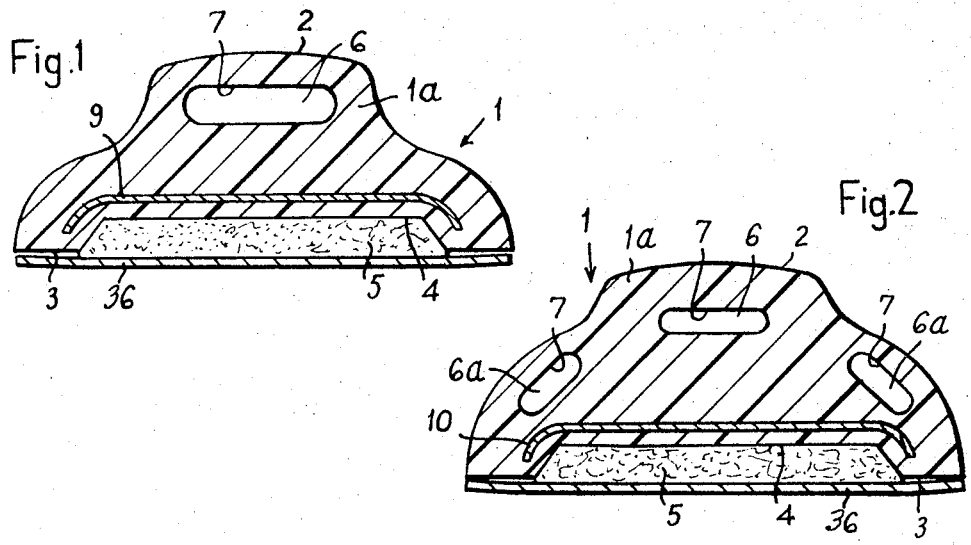
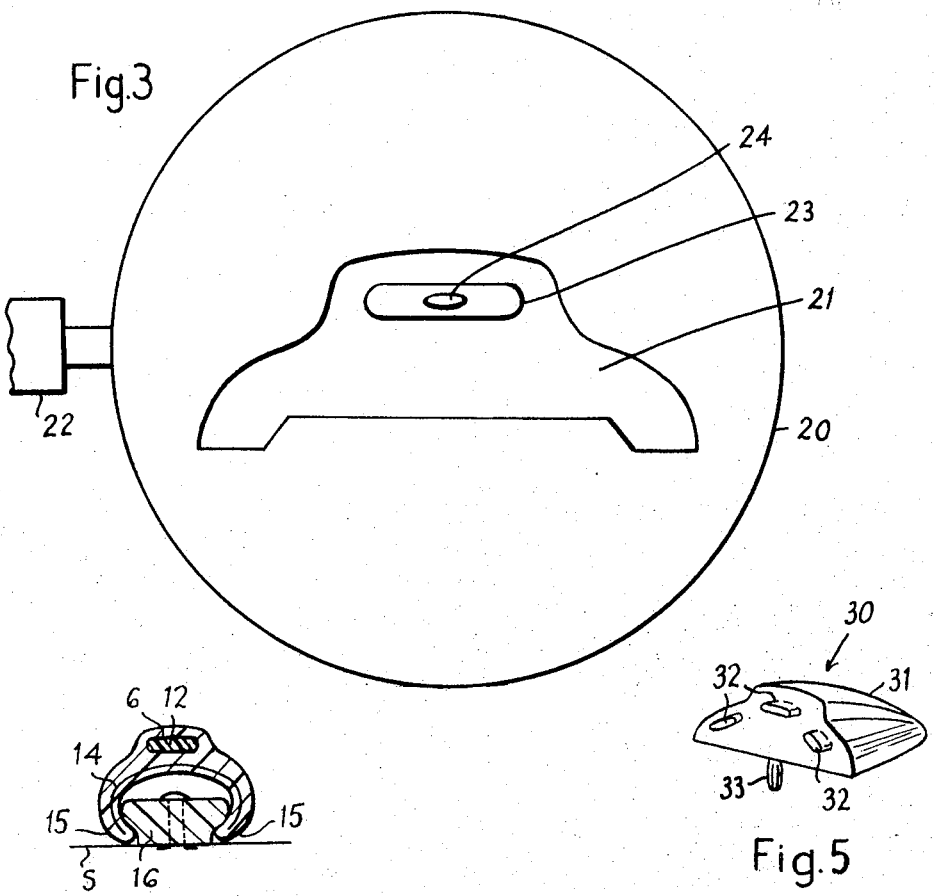

United States Patent Office 3,843,475
Patented Oct. 22, 1974

3,843,475
PLASTICS TRIM STRIPS
Cecil Kent, Woking, England, assignor to Creators Limited, Surrey, England
Filed Feb. 10, 1972, Ser. No. 225,038
Claims priority, application Great Britain, Feb. 15, 1971, 4,683/71
Int. Cl. B60r 13/04; E04f 19/02
U.S. Cl. 161—4                  3 Claims

ABSTRACT OF THE DISCLOSURE

This invention relates to decorative trims for automobiles, furniture and other articles and to methods of making same. A decorative trim according to the invention comprises a strip of plastics material having at least one longitudinal passage therethrough and one or both of a decorative material within said passage and a metal strip or metallised plastics strip embedded or encapsulated in the plastics strip behind said at least one passage. The decorative material and/or metallic strip are visible through the front surface of the strip, i.e. that surface which is exposed when the trim strip is fixed in position.

---

The invention consists in a decorative trim comprising a strip of synthetic resin plastics material such as polyvinyl chloride and cellulose acetate butyrate having at least one longitudinal passage therethrough, a decorative material within said passage, and a strip of foil presenting a metallic appearance embedded in said plastics strip behind said at least one passage, at least the plastics material in front of said at least one passage and said foil strip being transparent or translucent so that said decorative material and said foil strip are visible through the front surface of the strip, that is to say that surface which is exposed when the trim strip is fixed in position.

This invention relates to decorative trims for automobiles, furniture, and other articles.

Suitably the decorative material is in the form of a coating on the surface of the passage. For example, it may be a coating of coloured (which term is used herein to include black and white) paint or lacquer. Or a strip of metal foil or metallised plastics foil may be provided in the at least one passage, being bonded to the rear surface thereof, in which case the cross-section of the passage may be chosen to provide a desired optical effect. Other decorative materials, for example coloured plastics material, may be used.

The foil strip presenting a metallic appearance, e.g. a metal strip or metallised plastics strip, which is embedded in a trim according to this invention may have paint or the like applied to at least one selected area thereof to provide a modified decorative effect. For example one or more longitudinal bands of an opaque or translucent paint may be applied thereto.

In order that the invention may be more readily understood reference will now be made to the accompanying drawings, in which:

FIG. 1 is a section through one form of vehicle trim according to the invention, FIG. 2 is a section through a second form, FIG. 3 is a diagrammatic front end view of one form of extrusion apparatus according to the invention, FIG. 4 is a section through a further form of trim according to the invention, and FIG. 5 is a perspective view of an end finisher clip for use with the trim of FIG. 2.

Referring to the drawings, FIGS. 1 and 2 show two forms of trim according to this invention in the form of decorative strips suitable for securing horizontally along the side of a vehicle body. For example, four strips may extend along the front wing, front and rear doors, and rear wing of the vehicle respectively. The trims each comprise an extruded strip 1 of flexible synthetic resin plastics material of the configuration shown and having a front surface 2, and a rear surface 3 provided with an open channel or groove 4, which may be undercut or as shown, filled with a mastic or adhesive 5 by which the strip is stuck to the surface of the vehicle when its rear surface is pressed thereagainst. The adhesive is conveniently a butyl rubber adhesive such as that known as "PTI Autoglass Tape" made by Protective Treatments Inc. of Delrose Avenue, Dayton, Ohio, U.S.A. The exposed surface of the bonding composition in the channel or groove 4 may be covered with a protective paper strip 36, e.g. silicone paper which does not strongly adhere to the composition, which is removed prior to applying the trim in the position on the vehicle body to which it is to be stuck.

The channel or groove 4 is preferably shallow to reduce the amount of the adhesive 5 to a minimum. This avoids or reduces the tendency of the strip to be displaced by sideways pressure after it has been stuck to a surface. Further, the adhesive preferably stands proud of the mouth of the channel so as to ensure a good bond to the surface to which the trim is to be stuck. In a preferred embodiment the channel 4 is 0.030 to 0.050 inches deep and the adhesive projects proud of the channel by 0.010 to 0.015 inches or more.

In accordance with this invention, the trims have at least one longitudinal passage or bore hole 5 therethrough and a decorative material 7 within the passage, and at least the plastics material of the strip 1 in front of the passage being transparent or translucent. In the embodiments illustrated the strips 1 are extruded of crystal-clear polyvinylchloride. In FIG. 1 a single passage is provided in a raised central portion 1a of the strip. In FIG. 2, the portions at each side of portion 1a are thicker than in FIG. 1 and two additional passages 6a are provided in the side portions respectively. In both embodiments, the decorative material 7 is shown in the form of a coating, suitably coloured paint or lacquer, on the surfaces of the passages 6, 6a.

It will be appreciated that in addition to providing the front surface of the strip with a decorative appearance, the passages may also perform a shock-absorbing function.

The trims are also constructed to provide a decorative metallic appearance in addition to the decorative effect of the material 7, to which end, in the embodiment shown in FIG. 1, the strip 1 has embedded therein, behind the passage 6, so as to be visible through the front surface 2 of the trim, a thin foil 9 of transparent plastics material, such as the material known under the Registered Trademark "Mylar," which is metallised on one surface. The metallisation may be formed on the plastics film by spraying or vacuum depositing a metal coating, for example, of aluminium, onto the surface of a transparent or translucent plastics film, preferably a polyester film such as "Mylar" (Registered Trademark) or "Melinex" (Registered Trademark). The metal layer may be laminated between two strips of plastics film so that both surfaces of the metal layer are enclosed. The metallised strip may conveniently be constructed as described in British Patent Specification No. 1,253,355. Further the metallised strip may be bonded to a core in the manner described in British Patent Specification No. 1,056,697.

As in the embodiment shown in FIG. 2, the decorative metallic appearance may be provided by a strip of metal, e.g. aluminium foil 10 embedded or encapsulated in the strip 1 behind the passages 6 so that its bright surface is visible through the front of the trim strip.

One method of manufacturing a trim strip according to this invention comprises extruding the plastics strip 1 and at the same time introducing a decorative material into the passage or passages 6 formed therein. The decorative material may be introduced through the die in which the strip is being extruded. Thus, the decorative material may be introduced into the passage in liquid form as a paint or lacquer through a die pin by which the passage is formed.

In another method according to the invention, the decorative material may be introduced into the passage or passages in a separate operation carried out after the plastics material from which the strip is formed has been cooled. Thus the decorative material may be introduced in liquid form by a method which spreads the paint, lacquer or other decorative material over the surface of the passage, e.g. by blowing; from an aerosol device; or by gravity or pressure feed.

Conveniently, where the decorative material is introduced into the passage or passages in liquid form, it is compatible with the plastics material from which the trim strip is extruded. Thus, where the trim strip is extruded of polyvinylchloride the decoration could be a pigmented PVC-based lacquer heat-bonded to the surface of the passage or passages. However, the coating material need not be compatible with the trim material.

Where the trim strip is provided with a groove or channel in its rear surface containing an adhesive (as shown in FIGS. 1 and 2), the adhesive, e.g., a butyl tape, may be inserted, such as by injection or extrusion, into the channel 4 whilst the strip 1 is being extruded and after it leaves the extrusion die and has been cooled to avoid it being deformed during this operation. The protective paper strip may be fed over the mouth of the channel from a roll at the same time.

The extruded decorative trim may, after cutting to the required length, have its ends provided with a desired shaping finish by heating in a high frequency jig which is contoured to produce the desired form. This operation may also be used to close the ends of the channel or groove 4 and the ends of the passage or passages 6. Or the ends of the strip may be provided with end finisher clips. A form of end clip, suitable for a trim strip as in FIG. 2, is illustrated in FIG. 6. The end finisher clip 30 comprises a suitably shaped body portion 31 having projections 32 for engaging in the ends of the passages 6 of the trim strip and a rearwardly projecting snap fastener element or portion 33 for engaging in a hole in the vehicle body to which the trim is secured. As shown, the end finisher clip 30 may be a one-piece plastics moulding.

FIG. 3 shows diagrammatically an embodiment of extrusion apparatus for making a trim strip as illustrated in FIG. 1. The apparatus comprises a cross-head extrusion die 20 having a nozzle 21 to which plastics material is fed by an extruder 22. A die pin 23 arranged in the nozzle and supported therebehind serves to form the passage in the strip. The die pin has a passage 24 therein through which paint, lacquer or other coating material is fed into the passage. The die pin preferably extends outside the nozzle so that it supports the passage against collapse until the plastics material has cooled sufficiently to avoid it collapsing under its own weight, in which case the coating material, if it issues from the end of die pin, will be applied after the plastics material has cooled below the extrusion temperature. To ensure that the surface of the passage is uniformly coated, the paint or the like may be fed, under pressure, through a spray nozzle in the front end of the passage 24 or the front end of the passage 24 may be substantially as large as the die pin through which it extends. For making a strip as shown in FIG. 2, the die would include a die pin for each passage 6.

Other decorative materials may be provided in the passage or passages 6 and the trim strip of this invention may take other forms. For example, the decorative material may be a coloured plastics material, suitably in the form of one or more strips of desired cross-section. The coloured plastics material may be extruded with the plastics material of the trim strip or one or more pre-extruded strips of plastics material may be fed to the extrusion die through which the plastics material of the trim strip is extruded. An embodiment of trim strip 1 according to the invention is shown in FIG. 4 which has a strip 12 of coloured plastics material in a single passage 6 and a metal strip or metallised plastics strip 14 embedded in the strip 1 behind the passage 6. The strip shown is generally C-shaped in cross-section, having inwardly directed edge portions 15 for engaging behind clips, buttons or other fixing means to hold the strip in position on a vehicle body or other article to which it is to be secured. For example, the strip may be fitted over the gutter along the top edge of the passenger compartment of an automobile. Or, as shown, it may be a snap fit over an extruded base strip 16 fixed to the sides of a vehicle, for example, by any suitable fixing means, e.g. rivets.

Other decorative materials which may be used are, by way of example, metallic powder or flake, printed or perforated strip, cord, lace, etc.

Further, a modified decorative effect can be achieved by applying paint or other colouring material to selected parts of the metal or metallised plastics strip. Thus one or more longitudinal bands of an opaque or translucent paint may be applied to any of the strips 9, 10 or 14.

In the embodiments of FIGS. 1 and 2, the bonding material 5 may alternatively be of a polymerisable substance which, by curing, forms a firm and secure bond with the surface to which the trim is to be attached. Further, the bonding material may be a double-sided adhesive tape.

Whilst polyvinylchloride (PVC) has been specifically referred to above as the synthetic resin plastic material of the strip 1, it will be appreciated that other synthetic resin plastics materials may be used. For example, in the embodiments of FIGS. 1, 2 and 4 the strip may be extruded of cellulose acetate butyrate (CAB).

Whilst particular forms of trim strip have been described above, it will be appreciated that the present invention may be applied to any form of decorative trim, for example filler strips and trim strips for use in glazing window or windscreen openings, particularly in vehicle bodies.

I claim:

1. A decorative trim comprising a strip of synthetic resin plastics material having at least one longitudinal hollow passage therethrough extending the length of the trim strip, a decorative material within said passage in the form of a colored coating spread over the wall surface of the passage, and a strip of foil presenting a metallic appearance embedded in said plastics strip behind said at least one passage, at least the plastics material in front of said at least one passage and said foil strip being transparent or translucent so that said decorative material and said foil strip are visible through the front surface of the strip, that is to say that surface which is exposed when the trim strip is fixed in position.

2. A decorative trim according to claim 1 wherein said foil strip has coloured coating material applied to at least one selected area thereof and so as to be visible through the front surface of the trim strip, said coating material covering only a part of the foil strip.

3. A decorative trim according to claim 1, wherein said decorative material is selected from the group consisting of coloured paint, lacquer and plastics material.

References Cited

UNITED STATES PATENTS

| | | | |
|---|---|---|---|
| 3,755,052 | 8/1973 | Dressler | 161—5 |
| 1,972,283 | 9/1934 | Zimmers | 293—54 D |
| 3,451,709 | 6/1969 | Swauger | 293—1 |
| 3,471,979 | 10/1969 | Herr | 52—716 |
| 3,509,001 | 4/1970 | Shanok et al. | 161—5 |
| 3,606,433 | 9/1971 | Kunevicius | 293—1 |
| 3,616,099 | 10/1971 | Shanok et al. | 161—5 |
| 3,687,794 | 8/1972 | Shanok et al. | 161—5 |
| 3,720,567 | 3/1973 | Shanok et al. | 161—5 |

GEORGE F. LESMES, Primary Examiner

C. E. LIPSEY, Assistant Examiner

U.S. Cl. X.R.

52—312, 716, 717, 718; 117—95; 156—244; 161—6, 48, 139, 167, 406; 264—174, 177 R; 293—1, 62, DIG. 4